United States Patent
Feller

(10) Patent No.: US 6,422,093 B2
(45) Date of Patent: *Jul. 23, 2002

(54) BURST MODE ULTRASONIC FLOW SENSOR

(76) Inventor: Murray Feller, 21577 NW. 75th Avenue Rd., Micanopy, FL (US) 32667

(*) Notice: Subject to any disclaimer, the term of this patent is extended or adjusted under 35 U.S.C. 154(b) by 0 days.

This patent is subject to a terminal disclaimer.

(21) Appl. No.: 09/754,727

(22) Filed: Jan. 4, 2001

Related U.S. Application Data

(63) Continuation-in-part of application No. 09/458,315, filed on Dec. 10, 1999, now Pat. No. 6,178,827.

(51) Int. Cl.[7] ............................................. G01F 1/66
(52) U.S. Cl. ................................. 73/861.27; 73/861.29
(58) Field of Search ..................... 73/861.27, 861.28, 73/861.29

(56) References Cited

U.S. PATENT DOCUMENTS

| | | | |
|---|---|---|---|
| 3,555,899 A | * 1/1971 | Yamamoto et al. | 73/861.28 |
| 4,221,128 A | 9/1980 | Lawson et al. | |
| 5,440,936 A | * 8/1995 | Spani et al. | 73/861.28 |
| 5,533,408 A | * 7/1996 | Oldenziel et al. | 73/861.27 |
| 5,627,323 A | * 5/1997 | Stern | 73/861.28 |
| 5,644,090 A | * 7/1997 | Spendel | 73/861.27 |
| 5,804,739 A | * 9/1998 | Herrmann et al. | 73/861.27 |
| 6,178,827 B1 | 1/2001 | Feller | |

* cited by examiner

Primary Examiner—Harshad Patel
(74) Attorney, Agent, or Firm—David Kiewit

(57) ABSTRACT

An ultrasonic transit time flow sensor employs two transducers spaced out along a direction of fluid flow. A variable frequency acoustic signal is simultaneously transmitted by both transducers in a burst. After an interval corresponding to the expected transit time between transducers, both transducers are switched to their respective receiving states and a phase difference between their received signals is used as measure of the fluid rate. The invention also provides a feedback arrangement for controlling the acoustic frequency to maintain stable operation under a variety of operating conditions.

36 Claims, 4 Drawing Sheets

BURST MODE ULTRASONIC FLOW SENSOR

CROSS REFERENCE TO RELATED APPLICATIONS

This application is a continuation-in-part of application Ser. No. 09/458,315, filed Dec. 10, 1999, now U.S. Pat. No. 6,178,827 which issued on Jan. 30, 2001.

STATEMENT REGARDING FEDERALLY SPONSORED RESEARCH OR DEVELOPMENT

Not Applicable

BACKGROUND OF THE INVENTION

1. Field of the Invention

The present invention relates to a simplified method for measuring the flow rate of a fluid in which the propagation times of ultrasonic signals transmitted through the fluid can be detected to determine fluid flow rate. The invention further relates to improvement of a probe flow sensor configuration and to its installation, and similar sensing devices.

2. Background Information

Transit-time ultrasonic flow sensors, also known as "time-of-flight" ultrasonic flow sensors, detect the acoustic propagation time difference between the upstream and downstream ultrasonic transmissions in a moving fluid and process this information to derive a fluid flow rate. Several different sensor configurations have been used including: 1) direct measurement of the propagation time of a pulse emitted by a first transducer and received by a second transducer where the change in time is a function of fluid flow rate; 2) dual 'sing-around' sound velocimeters, where the difference in "sing-around" frequency between the velocimeters is a function of the fluid flow rate; 3) sensors producing continuous waves using two widely different high frequency carriers but commonly modulated with another much lower frequency signal where the phase difference of the modulated signal on the received carriers is a function of the fluid flow rate; and 4) sensors producing bursts of continuous waves using a single frequency on a pair of transducers, the burst duration being less than the acoustic propagation time between the transducers, where the time difference between the received transmissions is a function of flow rate.

The transducers of transit-time ultrasonic flow sensors are most often field mounted, and are commonly individually attached to the outside of a pipe, thereby offering the advantage of not having to break into the pipe in order to make the flow measurement. However, the uncertainty of the pipe wall integrity and the effects of its surface condition, and the uncertainties of locating, attaching and acoustically coupling the transducers to the pipe, as well as uncertainties of the reflection from the interior of the pipe when it is used to complete the acoustic path between the transducers, can often lead to substantial measurement error. Even when the transducers are in contact with the fluid being measured (i.e., wetted), their mechanical location may result in misalignment, being spaced at the wrong distance or set at the wrong angle, all of which can result in measurement error. As a result, these sensors are usually equipped with supporting electronics containing sophisticated diagnostic means for confirming proper installation and operation. Overall, these sensors are relatively expensive and have a reputation for sometimes producing erroneous measurements.

A notable example of prior art in this area is U.S. Pat. No. 4,221,128 to Lawson, who teaches an acoustic flow meter in which bursts of acoustic energy are periodically and simultaneously emitted by each of two transducers. The bursts are shorter than a transit time between the two transducers and a portion of the acoustic energy from each transducer is received by the other of the two transducers. Because of the fluid flow, there is a relative phase shift between the two received signals. This phase shift is measured by beating each of the received signals against a common reference signal to produce signals at a lower frequency at which the phase difference is more easily measured by means of electronic circuitry that is less expensive, consumes less power, and is more stable than older prior art equipment. The prior art methods cited by Lawson directly measured the phase difference at the higher frequency selected for acoustic transmission.

Further teaching in this area is provided by the inventor in U.S. patent application Ser. No. 09/592,313, filed on Jun. 13, 2000. In this application the inventor teaches a transit time ultrasonic flow sensor having two simultaneously transmitting transducers. This sensor is configured to compensate for circuit-related drifts in the flow rate output signal. During acoustic transmission some of the transmitting signal is also routed through the receiving circuits to generate a reference signal that is used to compensate the received signals. The disclosure of U.S. patent application Ser. No. 09/592,313 is incorporated herein by reference.

BRIEF SUMMARY OF THE INVENTION

It is an object of the present invention to provide means for reducing the complexity and cost of transit-time ultrasonic flow sensors, to improve their measurement reliability, and to make their installation easier.

It is a further object of the present invention to provide a cost effective means for enabling transit-time flow sensors to measure a fluid flow rate along two axes.

The above and other objects may be satisfied with a transit-time flow sensor configured as a single modular unit as exemplified in accordance with some preferred embodiments of the present invention. One of the preferred embodiments includes an insertion probe with two permanently mounted transducers which enters a relatively small opening in a pipe carrying a flowing fluid. A probe-mounted acoustically reflective surface is also provided to enable the acoustic path to be completed within the entity of the probe so that it does not depend upon any other reflective surface for its operation. This sensor is thus more simple in construction, easier to install correctly, and provides more reliable operation. The probe may of course be supplied factory mounted and calibrated in a short section of pipe, and thereby be considered a "full bore" sensor for installation between two similar pipe sections.

In an embodiment of the invention configured as a probe, the transducers are spaced out along the flow direction so that one is upstream relative to the other. These transducers are in line with and at an angle to the fluid flow, and are directly wetted by the fluid. In this configuration the sensor is isolated from the attenuation and multipath problems which occur when the transducers are pipe mounted. The supporting electronics may be simplified in concept and incorporate cost effective components while still offering good measurement precision.

One method of flow rate sensing used with the present invention differs from the four methods listed in the foregoing 'Discussion of Prior Art", in that it uses a variable frequency acoustic signal which is continuously transmitted by either one or the other transducers as they alternate between transmitting and receiving states. In this arrangement, a relatively low alternation frequency is the exclusive modulation source and the primary detection of time difference occurs at the transmitted acoustic frequency without using an intermediate frequency. This method, in its basic form, is unstable because of both acoustic path and electronic related drifts and frequency-related uncertainties. Special frequency control provisions have been employed to correct these deficiencies so that high flow sensing sensitivity, good zero stability and low noise level are obtained.

In a second method of flow rate sensing used with the of the present invention, the variable frequency acoustic signal is simultaneously transmitted by both transducers in a burst. After an interval corresponding to the expected transit time between transducers, both transducers are switched to their respective receiving states and a phase difference between their received signals is used as a measure of the fluid flow rate.

The invention provides transmission modes, both continuous or in bursts, and means of providing operating stability by controlling the acoustic frequency, that are also applicable to "full bore" sensors where the transducers are individually mounted rather than being configured as a probe. Furthermore, when using the burst mode flow sensing may be performed with the acoustic energy being conveyed through the pipe wall on which the transducers are mounted.

In yet other preferred embodiments, two pairs of transducers are used within a single sensor housing and are located to determine fluid flow rate components along two orthogonal axes, In further embodiments, an electric current is passed between surfaces of the sensor in the proximity of the acoustic path so that, by the process of electrolysis, those surfaces will be maintained clean.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

The various advantages of the present invention will become apparent to one skilled in the art by reading the following specification and subjoined claims and by referencing the following drawings in which:

FIG. 1A is a simplified end cross-sectional view of the sensor depicted in FIG. 1;

FIG. 3 is a schematic depiction of an arrangement of two pairs of transducer elements in accordance with a particular embodiment of the present invention.

DETAILED DESCRIPTION OF THE INVENTION

Figure 1:
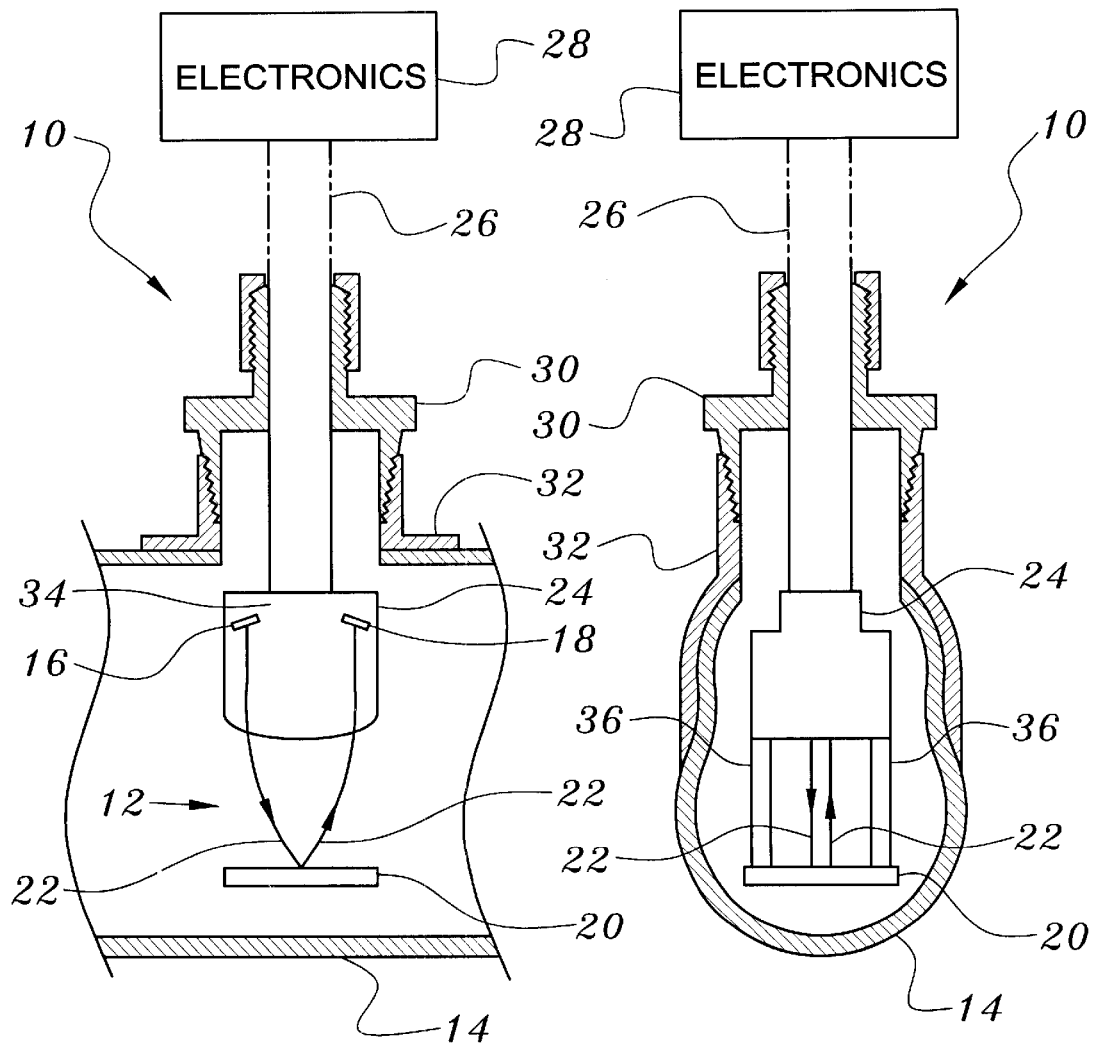
FIG. 1 is a simplified side cross-sectional view of a preferred embodiment of the ultrasonic transit-time flow sensor of the present invention.

Turning now to FIGS. 1 and 1A, one finds a depiction of a flow sensor 10 in accordance with a preferred embodiment of the present invention. This sensor is shown as it would be typically mounted in a pipe. Fluid, the flow direction of which is represented by arrow 12, enters the pipe 14 and passes between transducers 16 and 18, which are preferably piezoelectric transducers, but which may be other sorts of transducers known in the acoustic flow measurement arts. A reflector 20 is preferably used as a portion of the acoustic path so as to avoid using surfaces of unknown and uncontrolled quality, such as an inside of a pipe wall. Transducers 16 and 18 are preferably each mounted to reduce internal acoustic reflections and to direct the transfer of acoustic energy between each other by way of a reflector 20 so that at least a component of the acoustic energy is along an axis parallel to the direction 12 of flow. A material 34 such as cork can be used as an acoustic energy absorbing material surrounding each transducer and as a barrier between the transducers, as may be required to provide the acoustic isolation needed for proper operation. The dominant acoustic energy transferred between the transducers 16 and 18 is beamed along the lines indicated with the reference numeral 22. A housing 24, mounting the transducers 16 and 18, joins with a stem 26 upon which is mounted an electronics enclosure 28. A reflector 20 is supported by posts 36 that are a part of the probe. The stem 26 may, for example, be mounted through a fitting 30, facilitating insertion depth control, which engages a pipe mounted fitting 32.

During one mode of operation, one of the transducers 16 or 18 transmits while the other receives. Then they alternate functional states so that the transducer formerly transmitting receives, and the transducer formerly receiving transmits. In this mode, acoustic energy is transmitted by one or the other transducer 16 or 18 all of the time and is received by the non-transmitting one of the transducers 18,16 all of the time. The difference in phase shift between the acoustic energy signals of the two functional states is representative of fluid flow rate. With these and other refinements discussed subsequently herein, the acoustically self contained module which sensor 10 exemplifies exhibits low noise and high stability and measurement precision. The sensor 10 further enables the electronics to be simplified and the mechanical assembly to be standardized to cover a wide range of pipe sizes. Furthermore, the risk of improper operation due to installation error or pipe related factors is greatly reduced.

Figure 2:
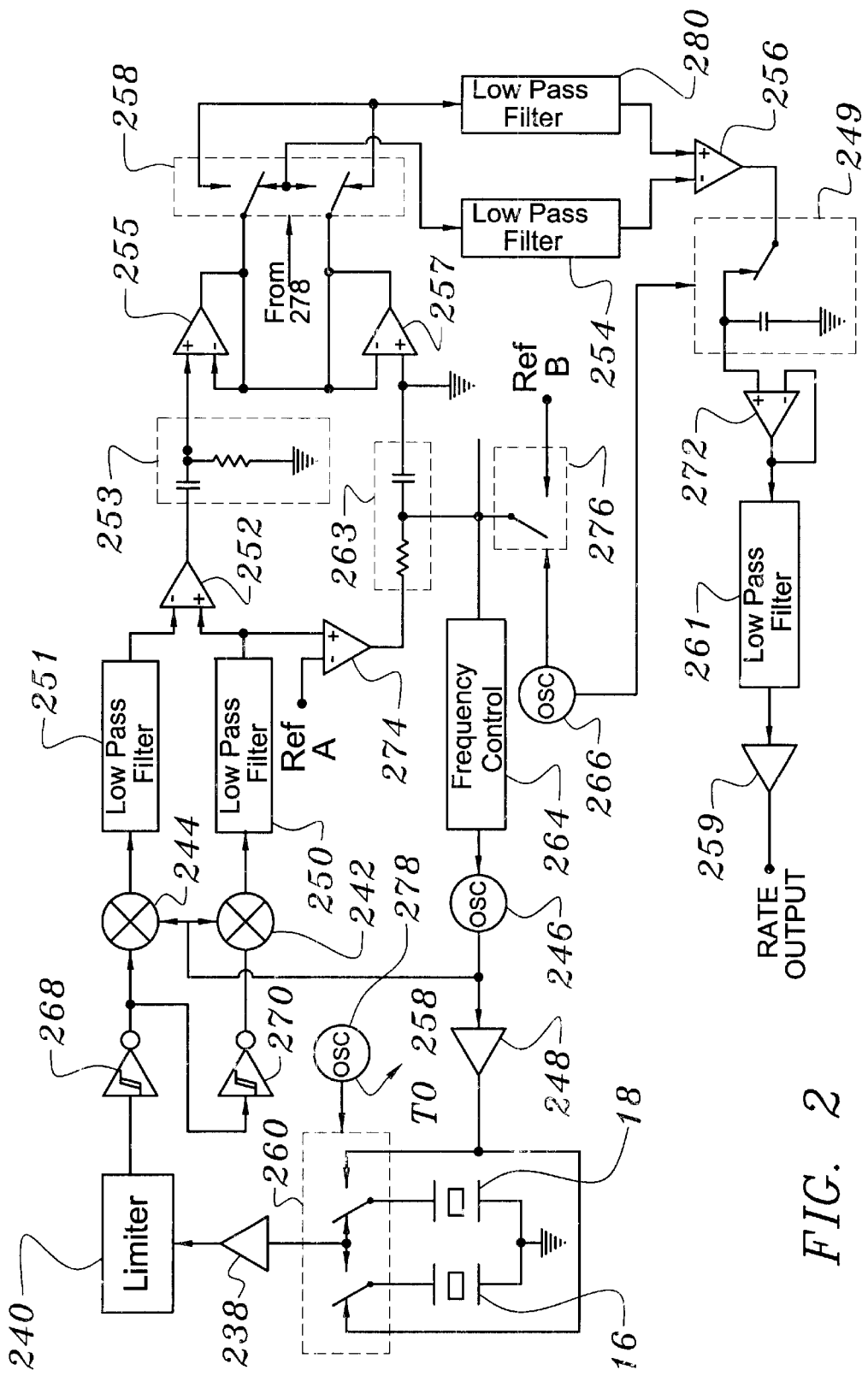
FIG. 2 is a block diagram indicating the functional blocks of electronic circuitry of a continuous transmitting embodiment of the invention.

FIG. 2 is a block diagram of representative electronic circuitry used with an embodiment of the present invention that employs wetted transducers. In this depiction an oscillator circuit 246 generates a carrier signal at a selected high frequency (e.g., 4 MHz). This carrier signal is amplified by amplifier 248 and routed through a relay 260 to a transmitting transducer 16. The acoustic energy received by the other transducer 18 is converted to a corresponding electrical signal which is routed through a relay 260 to an amplifier 238, and then to a limiter 240. The output from the limiter 240 enters a first Schmitt trigger 268 which provides inverted signal to both a phase detector 244 and a second Schmitt trigger 270. The output signal from the second Schmitt trigger 270 enters a phase detector 242. Both phase detectors 244 and 242 also receive a common input from the carrier signal oscillator 246, and each provides an output signal to the corresponding low pass filters 250 and 251, whose outputs enter a differential amplifier 252. The alternating signal component of the signal from this amplifier 252 passes through a differentiating circuit 253 to a buffer amplifier 255 and then to an inverting buffer amplifier 257. The output of the inverting buffer amplifier 257 is routed by a relay 258 to the low pass filters 254 and 280 and then to a differential amplifier 256. The output from the differential amplifier 256 enters the switch 249 and is routed through a buffer amplifier 272, a low pass filter 261, and an amplifier 259 to provide the rate output signal.

In this embodiment, an oscillator 278 activates relays 260 and 258. Another oscillator 266 activates two switches 276, 249. An amplifier 274 detects the voltage difference between the output from the low pass filter 250 and a reference voltage "A", and produces an output signal which passes through another low pass filter 263 to the frequency control 264 in order to vary the frequency of the carrier signal oscillator 246 as in a phase locked loop. The output from the low pass filter 263 is also switched to a reference voltage 'B" when the switch 276 is activated by the oscillator 266. Balanced circuits are indicated to reduce drift and increase dynamic operating range.

The carrier signal oscillator 246 produces a continuous carrier signal at a high frequency, which may be on the order of 4 MHz. This signal is increased in magnitude by an amplifier 248 and routed through relay 260 to transducer 16 which emits a corresponding acoustic signal. A portion of that acoustic signal is received by transducer 18 which converts it into a corresponding electrical signal that is routed by a relay 260 to an amplifier 238 to increase its magnitude and then to a limiter 240 to produce a relatively large output signal for the smallest received signal of interest. This insures that the Schmitt trigger 268 is reliably switched between its trigger points. The Schmitt trigger 268 drives the second Schmitt trigger 270 so that phase detectors 244 and 242 provide 180 degree phase opposed received signals while their other inputs from oscillator 246 are of the same phase. The outputs from the phase detectors 244 and 242 are therefore phase opposed and enter low pass filters 250 and 251 to remove the high frequency components prior to entering a differential amplifier 252. The differential amplifier 252 extracts their difference voltage, the magnitude of that voltage being a function of the phase difference between the oscillator 246 signal and the signal provided by transducer 218.

Relays 258 and 260 are activated by oscillator an 278, which produces a square wave at a relatively low frequency, typically 100 Hz. Relay 260 comprises means for alternating receiving and transmitting functional states for the two transducers and so that the difference in the transit times between the upstream and downstream acoustic paths resulting from relative movement between the transducers and the fluid flow being sensed produces an alternating signal at the output of amplifier 252. The DC component of the output signal of amplifier 252 is removed by differentiating circuit 253 so that only the magnitude of the alternating component of that signal enters buffer amplifier 255 and then its inverting amplifier 257. DC drifts present at the output of amplifier 252 are thereby eliminated so that they will not affect the output and, in particular, the zero stability of the rate output signal.

In this embodiment the phase opposed signals from the amplifier 255 and the inverter 257 are synchronously switched by the output relay 258 at the 100 Hz frequency provided by the oscillator 278. This provides rectification of the signals, which are then smoothed by low pass filters 254 and 280 prior to entering differential amplifier 256.

The output signal from amplifier 256 is thus a DC voltage responsive to the magnitude of the difference in transit time between the mode of operation where transducer 16 transmits while transducer 18 receives, and the mode of operation where transducer 18 transmits while transducer 16 receives. The output from amplifier 256 enters the normally closed switch 249, which has a capacitor in parallel with its output for retaining the most recent output voltage from the amplifier 256 in the event the switch 249 is opened. Amplifier 272 is a high impedance buffer amplifier used to minimally discharge the capacitor when switch 249 opens and to provide the signal through the lowpass filter 261 to the output amplifier 259.

Transducers exhibit the equivalent of acoustic phase drift in characteristics due to aging, changes in temperature, mechanical stress and other factors. All of these affect the precision of the flow rate measurement. The mechanical mounting of the transducers and their relationship to the acoustic reflecting surfaces that they interact with, particularly if those surfaces are of plastic, may be unstable over a period of time. These instabilities may arise from moisture absorption, accumulation of surface contamination and stress relief, among other causes. Mechanical stress and temperature change can also cause acoustic phase drift. Because of the desire to produce a small insertion probe, the spacing between the transducers is relatively small and relatively small mechanical changes increase the drift problem. The higher frequencies desired to increase phase detection sensitivity coact with the small transducer-to-transducer spacing to produce further instabilities. Add the above drift promoting factors to the phase drifts produced by the supporting electronics, particularly when they are of relatively low cost commercial quality and designed with a clear intent to reduce costs, and the total impact of these drifts can be catastrophic for a transit-time flow sensing product. It can now be appreciated that the prior art does not overcome these difficulties to produce a commercial product competitive with probes relying on other flow sensing technologies, while the present invention provides several successful approaches.

It may at first seem obvious that the phase locked loop would alone be sufficient to provide frequency control of the carrier signal oscillator 246 so that the average output from phase detector 242 is maintained in the center of its operating range. However, this is not the case. Consider for example, that while the frequency range of the carrier signal oscillator 246 needs to be great enough to compensate for the few acoustic wavelengths of maximum possible phase drift, it should be no greater than that in order to minimize oscillator phase noise and drift. This would be, for example, the equivalent of one or two acoustic wavelengths on either side of its center frequency. However, should phase lock occur with the carrier signal oscillator 246 operating close to a limit of its frequency range, and where subsequent phase drift would require the oscillator 246 to change its frequency in the direction that it is incapable of accommodating, the resultant will be sensor performance degradation, or actual failure. The oscillator 246 might become phase locked close to a frequency limit when operating power is applied, for example, or because the acoustic path has been broken by insufficient flowing fluid or because of absorption of the acoustic energy. This could also occur because of reflection or scattering of the acoustic beams due to transient changes in the composition of the flowing fluid, or because of phase drift inherent in the sensor. In any case, a means is required to both initialize and maintain the frequency of oscillator the carrier signal oscillator 246 and the phase detector 242 in the nominal center of their operating ranges.

The above means is augmented by providing a switch 249 which is activated by oscillator 266, and which produces a pulse at a very low frequency—e.g., once every minute. This enables the frequency control circuits to reset to the center of their operating range. During the time of this pulse and for a short time afterwards, as required to enable the circuits to stabilize the output, the differential output amplifier 259 is maintained at the value existing just before the pulse occurred to avoid upsetting the rate output signal. This may, for example involve a total duration of two seconds.

The oscillator 266 of FIG. 2 also activates the relay 276 to connect the reference voltage "B" to the capacitor of long time constant filter 263 during the oscillator 266 pulse. This forces it to the voltage which acts on the frequency control circuit 264 to adjust the frequency of the carrier signal oscillator 246 to the nominal center of its operating range. At all other times, the signal representative of the phase difference between the oscillator 246 and Schmitt trigger 270 signals, as it appears at the output of low pass filter 250, is used in conjunction with amplifier 274 and low pass filter 263 as in a conventional phase locked loop. Reference voltage A is of the magnitude corresponding to the center of the operating range of the detector 242 so that the amplifier 274 will vary its output voltage to maintain the voltage on its positive input essentially equal to that on its negative input, thereby locking the loop. The low pass filter 263 has a relatively long time constant so that its output does not contain a significant 100 Hz component. This enables the phase locked loop to respond only to the average of the phase detector 242 output, while the full alternating component of its signal enters amplifier 252.

An alternative method of control is to have a phase shift block with a similar number of acoustic cycles of phase shift capacity located between oscillator 246 and the phase detectors 242 and 244, which is similarly controlled by phase detector 242, low pass filter 250, amplifier 274 and low pass filter 263 to maintain the phase detector 242 output centered in its operating range. In this case, the phase shift block is periodically connected by switch 276 to the reference 'B" voltage to force its operation to the nominal center of its operating range. In this method, oscillator 246 is not frequency controlled and the frequency control block 264 is omitted.

Reset of the phase locked loop occurs periodically as a function of the frequency of the oscillator 266. Reset can also occur by alternate means, for example, by detecting when power is first applied, when the average output from phase detector 242 is detected to be sufficiently removed from its center value, when the acoustic signal is reestablished after loss or when other criteria are met.

The use of balanced circuits, as in the case of phase detectors 242 and 244, for example, reduces the upsetting effect of the reset pulse. This is because the oscillator 246 is never phase locked exactly to the center of its frequency range and must make an abrupt frequency change before resuming stable phase lock. In some applications this disruption may be small enough to be insignificant so that relay 249 and amplifier 272 may be omitted. Furthermore, relay 249 and amplifier 272 may be omitted if the reset pulse occurs infrequently enough for the intended sensor application, although it produces a significant change in the rate output signal.

The reset means and overall high sensitivity signal-to-noise ratio employed in the present invention, as exemplified in particular in FIG. 2, make the sensor very tolerant of operating conditions. Flow probes can now be made economically with small dimensions which make them easy to install. These probes can have their transducers set at small angles, such as 75 degrees with respect to the flow axis, and thereby be relatively small so that the hole in the pipe through which the probe passes during installation is likewise relatively small. For example, a probe may be made with a 0.8" transducer-to-transducer spacing, which allows it to fit through a 1.0" hole in the wall of a pipe. Furthermore, the probe will be relatively tolerant of variations in the distance between the reflector and the transducers so that it can even be supplied without the reflector and rely instead on the opposite inside wall of the pipe to act as the reflector and complete the acoustic path between transducers A relatively small amount of low pass filtering enables the amplifier 256 output to respond to rapidly changing flow rates so that characteristics of the fluid system in which the probe is used, such as pulsations due to pump impellers, can be detected and provided as an output signal indicative of impeller condition. The sensor 10 may then additionally serve as a flow system maintenance monitor.

The amplifier 256 output may also be used to detect flow variations due to vortex shedding or fluidic oscillators, for example. If only flow detection of flow variations is required, the circuit may be simplified by eliminating relay 260, amplifiers 257, 272 and 259, low pass filters 261 and 280, and relay 249. Flow rate pulsations due to Karman vortices, as may be produced by a bluff body in the flow stream, can set up a street of vortices that pass through one or both acoustic beams of the transducers 16 and 18, of sensor 10. In this arrangement the frequency of the detected pulsations is proportional to flow rate. The bluff body may be located to one side of or between the acoustic beams 22. However, if the sensor 10 is rotated in its fitting 30 by ninety degrees, one of the posts 36 may be used as the bluff body to produce the vortices.

In the process of detecting the phase difference between the received and transmitted signals, DC offsets appear at the output signal of amplifier 252, which may drift over a period of time and seriously affect the zero flow stability of the sensor. By removing the DC component of that signal with a differentiating circuit 253, that source of error is eliminated. In the sensor referred to earlier, zero stability equivalent to a sensed flow rate of 0.05 inches/second has been observed. This is significant particularly when it is noted that no high stability or matched filters or other sophisticated or inherently expensive components were used, the transducers were not impedance matched for both the receiving and transmitting functions. Furthermore, conventional and relatively low cost commercial components were used throughout to reflect the commercial intent of future products based upon the present invention. Additionally, only three adjustments, these being output zero, output span and center frequency, are required for the entire circuit Exclusive-OR gates operating at the carrier frequency are preferably used as the phase detectors 242 and 244 to detect the phase shift between the locally generated signal from oscillator 246 and the received signal from transducer 16 There is no translation of frequency, and therefore no corresponding phase noise and drift. The circuit would also function if the phase detectors were supplied with receive signals having the same phase while the signals from oscillator 246 were phase opposed. The carrier frequency used is relatively high, typically 4–10 MHz, so that a substantial flow related phase shift occurs for a physically small probe.

It is noteworthy that the transmitting signals may be seriously distorted without seriously affecting the overall operation of the sensor. The output of amplifier 248 is a square wave, whereby only a small inductive impedance in series with relay 260 is used with the transducer capacitance to provide a semblance of series resonance or low pass filtering. Furthermore, the circuit is very tolerant of impedance mismatch of the transducers 16,18, between the functions of transmitting and receiving, so that in an existing practical sensor design there is no provision for such matching.

Because the transmitted and received acoustic signals are always present in this embodiment of the present invention in which each transducer operates half of the time to transmit and the other half to receive, phase detection occurs over many carrier cycles. Hence, signal detection averaging is extensive and the signal-to-noise ratio is high. Therefore, at the relatively low alternating frequency of 100 Hz (compared to a 4 Mhz carrier frequency) and the relatively short acoustic transit time (because of the short length of the acoustic path between the transducers), any error introduced because of resultant signal delays in the acoustic path between the transducers will, on the average, be a very small factor of the rate output signal and will therefore be negligible. However, should the transit time become significant, one or more functional blocks for receiving or detecting the rate related signals, such as a portion of relay 260 and amplifiers 238 and 268, limiter 240, inverter 270, and phase detectors 242 and 244, would be disabled for the required interval during the transducers transmitting/receiving alternation.

When the acoustic signals are reflected between the transducers by a flat reflector, the received signal is a summation of transmitted signals, including those having taken more than one path because of beam spreading. As the selected transmitted frequency changes to maintain phase lock and center the operating points of phase detectors 242 and 244, the change in the relative magnitudes and phase relationships of the components of the received signal may cause increased noise and drift in the rate output signal. This problem may be reduced by curving the surface of the reflector facing the transducers in the direction along the axis between the transducers with a radius equal to about two times the distance between the midpoint between the transducers and reflector. Because this degree of curvature is very small, it should not affect fluid flow sensing in most applications. The inside surface of a pipe would not provide the same benefits because its curvature is orthogonal to that desired.

In some applications it will be desired to operate the sensor with low power. Considerable power reduction without serious loss of flow measurement precision may obtained by enabling all the sensor's functional blocks operating at the acoustic path frequency to operate for only a few alternating cycles within a larger period of operation, whereby low pass filter 263 becomes equipped with a sample-and-hold circuit to retain its frequency control voltage during that period. Relay 249 acts in effect as a sample and hold circuit and would be switched to the amplifier 256 only during the latter portion of the alternating frequency cycles when the amplifier 256 output signal has stabilized.

Since the functional blocks operating at the acoustic path frequency consume almost all of the operating power of the sensor, a large power reduction is possible. For example, with a larger period of one second and the acoustic path functional blocks being active for 100 milliseconds, the power reduction is nearly 90%.

The flow sensor configuration of probe 10 is also suitable for use in open channels and in large bodies of water for example, as it provides for the complete reflective path within itself and can operate with low power. Furthermore, a second set of transducers 370, 372 located in an enlarged form of housing 24, and mounted orthogonally to transducers 16 and 18, which similarly beam to and receive from reflector 20, will provide a measurement of flow rate in a direction orthogonal to the first set so that their rate and directional components enable a resultant flow rate and angle to be determined by electronic computation. Such a transducer arrangement is illustrated in FIG. 3 where transducers 16,18 of probe 10 establish an acoustic energy beam line 22. The beam line 22 is reflected by reflector 20 to sense the component of fluid flow which moves horizontally across the page, in the direction of arrow 12. Transducers 370 and 372, mounted in the same housing, establish a second acoustic energy beam, represented by lines 374, to sense the component of flow moving orthogonally to the first beam. It is possible for both sets of transducers 16, 18 and 370,322 to operate at the same time with their own supporting electronics when the acoustic beam angles are narrow if there is otherwise good acoustic and electrical isolation between them. However, they may also time share the same electronics or operate at different frequencies.

The installation of probe 10 in a pipe for example, typically requires that it be angled to the flow precisely if the best flow sensing accuracy is to be achieved. Observing an indication of a flow rate measurement while adjusting the probe angle for the maximum indication is useful but often unsatisfactory, considering that flows are often not constant enough. A pipe-mounted flow probe configured as in FIG. 3 however, would do very nicely because the second set of transducers 370 and 372, sensing fluid flow orthogonal to primary flow direction 12 through the pipe, would be aligned to produce an output signal null when the probe angle is exactly correct. As a null indication, the magnitude of the fluid flow rate is not important as long as some flow is occurring so that a steady flow rate is no longer necessary. A null type of indication is also more sensitive and can be made to respond faster.

In some fluid handling systems, the fluid flow is not reasonably uniform and straight, and may have a variability depending on flow rate and other factors such as nearby valve states. The affects of these non-uniformities may also be sensed by the second set of transducers 370 and 372, with their flow responsive signals being used for correcting the flow measurements derived from the other transducers 16 and 18.

The second set of transducers 370 and 372, if not used to provide a precision rate measurement, need not be mechanically located as shown, and do not even have to make use of the reflector 20. Transducers 370 and 372 merely need to lie parallel to and facing each other with the flow and acoustic energy passing between them so as to respond to the component of flow which is not parallel Since transducers 370, 372 have the axis between them perpendicular to the fluid flow, they may additionally be used to directly measure the speed of sound of the fluid whereby the output signal obtained therefrom is used, for example, to vary the gain of amplifier 259 in order to compensate for flow rate errors due to fluid temperature or composition changes. Any suitable supporting electronics configurations including those listed in the earlier "Discussion of Prior Art" section may be used to obtain the related output signals. Compensation means may also be had by measuring the temperature of the flowing fluid and using the output signal obtained therefrom to similarly vary the gain of amplifier 259 when there is close correlation between the fluid temperature and the speed of sound.

Figure 6:
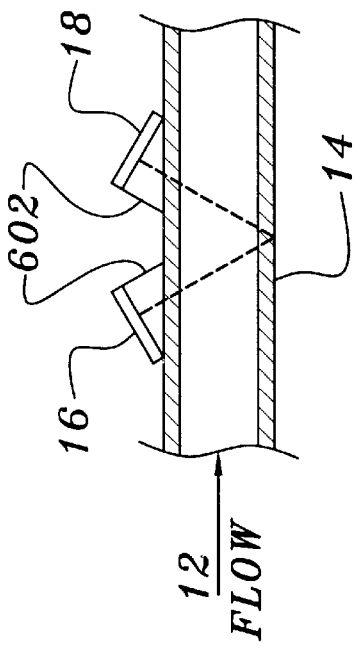
FIG. 6 is a partly schematic depiction of fluid flow in a chamber having two facing detectors disposed at its ends.
Figure 5:
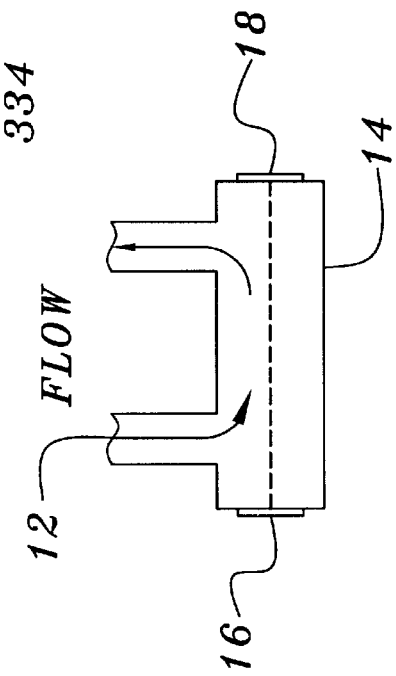
FIG. 5 is a partly schematic view of two transducers attached to the outside of a pipe.

Although the immediately preceding discussion is primarily directed toward a probe configuration, the apparatus and method of the present invention are also applicable to other configurations using similar digital processing electronics. Such arrangements could include an in line flow sensor containing transducers which are well acoustically isolated from each other and from whatever housing is employed. For example, the depiction of FIG. 5 shows a fluid flowing through a generally U-shaped pipe 14 having two transducers 16,18 in acoustic contact with the fluid and arrayed along a straight line so that they are directly facing each other. An alternate embodiment is shown in FIG. 6, where two transducers 16,18 are shown attached to the outside of a pipe 14 by means of appropriate adapters 602. Moreover, the reflector 20 described above with respect to the probe configuration, is not an essential element. In some cases (e.g., FIG. 5) no reflector is needed, in others (e.g., FIG. 6) a portion of an existing structure, such as the pipe, can be used as a reflector. In yet others, more than one acoustic reflector may be used to convey the acoustic signal between the transducers.

Figure 4:
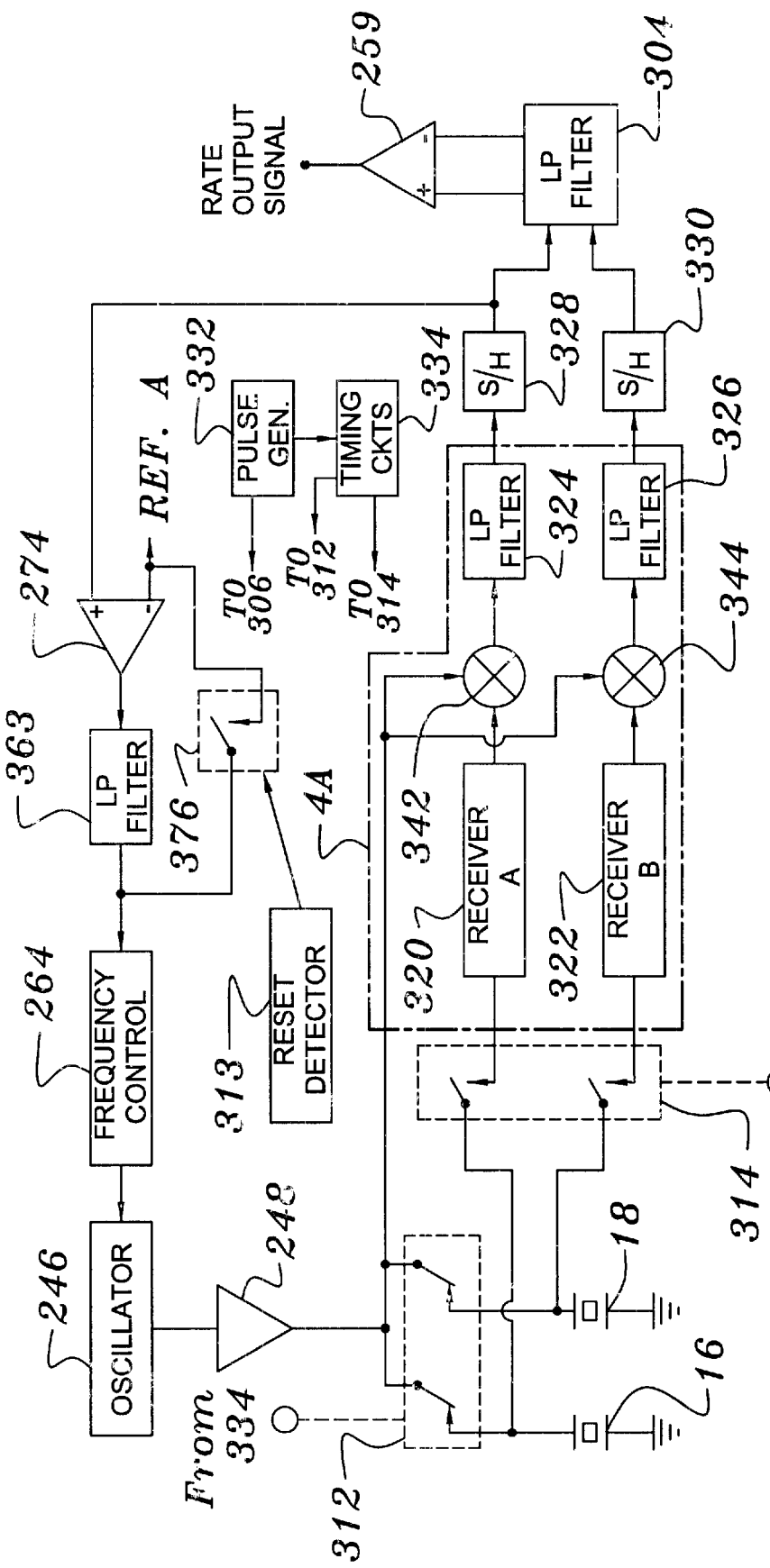
FIG. 4 is a block diagram of a burst transmitting embodiment of the invention.

Turning now to FIG. 4, one finds a block diagram of an electronic circuit for a second embodiment of the present invention. In this circuit, the carrier signal oscillator 246 generates a high frequency carrier signal which is amplified by a carrier amplifier 248 and routed to phase detectors 342 and 344, as well as passing through a transmitting switching means, which is preferably a relay 312, to the transducers 16 and 18 when the relay 312 is briefly closed, thus causing both transducers 16, 18 to simultaneously emit respective bursts of acoustic energy into the fluid. After a time interval determined by the transducer-to-transducer spacing and the speed of sound in the fluid, each transducer 16, 18 begins to receive a portion of the acoustic energy earlier emitted by the other 18, 16 transducer. The transducers 16 and 18 convert the respective received acoustic energy to electrical signals which are switched by a receiving switching means, which may be a relay 314, to enter respective receivers A, 320, and B, 322. The outputs from these receivers enter respective phase detectors 342 and 344. Each of the phase detector 342, 344 outputs, which is a time-varying voltage, passes through a respective low pass filter 324, 326, a respective sample and hold 328, 330, low pass filters 304, and finally a differential output amplifier 259 to provide a DC voltage level as the rate output signal.

In addition to providing means for generating, receiving and processing the acoustic signals, the circuit of FIG. 4 is also configured to provide several ancillary features that aid in operational stability. The output of one of the sample and holds 328 is applied as an input to an amplifier 274 along with a reference voltage (labeled Reference A in the drawing). The output from the amplifier 274, applied through a low pass filter 363, is supplied as an input to a frequency control circuit 264 and is used to control the frequency of the carrier signal oscillator 246 so the phase detector, on average, operates in the middle of its operating range. In addition to the above recited elements, the circuit of FIG. 4 comprises a reset detector 313 arranged to operate a relay 376 or other appropriate switching means to exert momentary control of the frequency control circuit 264.

A pulse generator 332 and timing circuits 334 provide the enabling signals to operate the various circuit blocks depicted in FIG. 4 to provide signals having a proper duration and in a correct sequence. As discussed in a subsequent portion of this document, the control pulses supplied by these control circuits 332, 334 are preferably configured to provide pulse durations on the order of tens of microseconds occurring in a fixed sequence at repetition rate on the order of 100 Hz. Those skilled in the electronic arts will realize there are many design choices that can be used to provide for these functional features.

During typical operation, the carrier signal oscillator 246 generates a high frequency carrier signal at for example, 4 MHz. To conserve electrical power, the carrier signal oscillator is not operated constantly. Generally speaking, it needs to be turned on shortly before an acoustic transmission is to be made so that its frequency and amplitude stabilize before the transmitting relay 312 is closed. The oscillator 246 can be turned off immediately after the phase detection process (or, more specifically, the sample and hold 328 and 330 operation) has been completed. For a probe application as illustrated in 10 of FIG. 1, where the transducer 16 to transducer 18 spacing is 0.8" and the transducer to reflector 20 spacing is 1.8", the oscillator need only operate for a few hundred microseconds. The amplifier 248, which provides isolation for the carrier signal oscillator 246 and which powers the phase detectors 342 and 344 and transducers 16 and 18, is typically operated for a shorter period, in fact just long enough so that the acoustic signals can be transmitted and received. For the above recited dimensions of a probe 10 this requires about one hundred and twenty six microseconds for an acoustic excitation to make a round trip between the two transducers and to detect the flow rate signal.

Figure 4A:
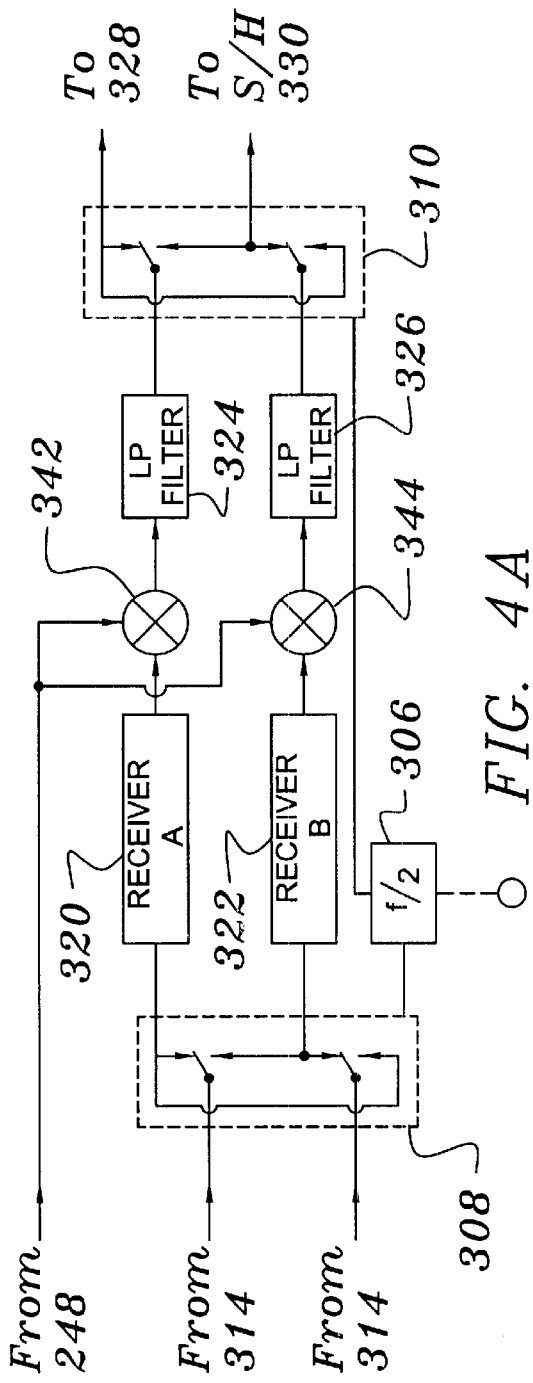
FIG. 4A is a block diagram showing an alternative arrangement of the receiver portion of FIG. 4.

During the acoustic transmission of sit three microseconds, the transmitting relay 312 is energized to connect transducers 16 and 18 in parallel with the transmitting amplifier 248, thereby minimizing any change in phase between the two transmitted signals. During the next sixty three microseconds, in which the acoustic energy is being received by transducers 18 and 16, this relay 312 is de-energized while the receiving relay 314 is energized to route the transducer signals to the respective receiver, 322, 320, which then provide those two signals, along with that from the transmitting amplifier 248, to the phase detectors 342 and 344. It may be noted that this step of referencing measured phase shifts to the transmitting oscillator provides an improved degree of operational stability over prior art circuits that do not provide this reference and that are therefore subject to drift errors. Although the depiction of FIGS. 4 and 4A show separate relays in the interest of clarity of presentation, one skilled in the circuitry arts will recognize that the transmitting and receiving switching means can be provided by other components, such as a single more complex relay that can act as both the transmitting and the receiving means, solid state switching elements, and the like.

The outputs from phase detectors 342 and 344 enter respective low pass filters 324 and 326 which respond fast enough to capture the full magnitude of the phase detected pulse during the receive period while minimizing any high frequency ripple. The sample and hold circuits 328, 330 are enabled during the latter portions of the phase detected pulses, for example the last 40 microseconds, to capture signal values from well stabilized pulses.

The output signals from the sample and hold circuits 328, 330 pass through a low pass filters 304 to suppress fast signal changes, and then to an output amplifier 259 which extracts the difference in voltage between the two sample and hold circuits. This difference is representative of the fluid flow rate and is the output signal provided by 259. It will be appreciated that the output amplifier 259 may also include additional low pass filtering.

The output from one of the sample and hold circuits 328 is also supplied as an input to an amplifier 274 that has a reference voltage A applied to it as well. Typically, the reference voltage A corresponds to the center of the operating range of one of the phase detectors 342. Moreover, the phase relationship of the amplifier 274 and the frequency control module 264 is such as to control the frequency of the oscillator 246 so as to maintain the average output from the phase detector in the center of its operating range, as is done in a conventional phase locked loop, thus providing the same functionality as was done by other means in the circuit of FIG. 2. The low pass filter 363 incorporates a long time constant circuit so that the frequency change is very slow so that the controlled frequency does not change responsive to measured phase shifts. One skilled in the art will realize that although the depicted circuit uses feedback from only one of the two sample-and-hold components, other feedback arrangements using an output from at least one sample-and-hold are possible. For example, one could invert the output from the second sample-and-hold, average that inverted value with the value from the first sample-and-hold and then use the newly formed composite signal as a feedback input to the amplifier 274.

In the depicted circuit, a reset relay 376 is activated by reset detector 313 to momentarily connect the frequency control 264 to a reference voltage, which is typically reference voltage A, to force to the oscillator 246 to operate in the center of its operating range. The purpose and functionality of the reset mechanism is similar to that described with respect to the circuit of FIG. 2. The reset mechanism may similarly be activated periodically by a low frequency oscillator or by detection of a condition which requires reset, such as a power fluctuation or the frequency control 264 operating point being too close to or at an operating limit. It is also noted that the range of oscillator frequency control may be narrowed and the reset mechanism omitted in the flow sensing systems illustrated in either FIG. 2 or FIG. 4 if the circuit components and operational environment be adequately stable.

A portion 4A of the circuitry shown in FIG. 4 can be replaced by the circuitry of FIG. 4A in order to null out errors and fluctuations arising from electronic component sources—i.e., from circuitry sources, rather than from flow fluctuations or inhomogeneities. Each receiver/phase detector/low pass filter path provides its own contribution of drift and offset which is ultimately canceled by appearing as a common mode signal. The modification comprises the addition of two signal route exchange relays 308, 310 operated together to interchange the input and output connections of the received signal processing circuits. For example, during a transmission/reception cycle in which the route exchange relays 308, 310 are in their respective first settings, as depicted in FIG. 4A, the received signal from transducer 16 is routed through relays 314 and 308, receiver 320, phase detector 342, low pass filter 324 and relay 310 to sample and hold 328. During the next transmission/reception cycle, the route exchange relays 308, 310 switched to their respective second setting and the same signal processing elements (i.e., receiver 320, phase detector 342 and low pass filter 324) process the signal from transducer 18 and provide that processed signal to the sample and hold 330 associated with that transducer 18. The signal path toggling can be provided by means of a frequency divider 306 which energizes the route exchange relays 308 and 310. This frequency divider 306 is triggered by a pulse generator 332 to alternate the signal routing. In a preferred embodiment, the frequency divider 306 operates at one half the selected repetition rate so that the signal routing is toggled after each transit time interval. This alternation in the routing of the received signals between the parallel receiving circuits that provide the amplification and phase detection functions allows one to average out the differential phase error introduced by those circuits by averaging the outputs of the phase detectors over a selected number of repetitions of the transmission/reception cycle.

In addition to exhibiting a high degree of stability, a flow sensor incorporating the features of FIG. 4 or FIG. 4A can be designed to consume relatively little power. For example, if the acoustic signal processing circuits are active for 200 microseconds and their repetition rate is once every 10 milliseconds (100 Hz), the duty cycle is 1/50 or 2%. If those circuits require, for example, 5 volts at 50 milliamperes when active, their average consumption is only 1 milliampere. If the repetition rate were only once every 100 milliseconds, the average consumption would be only 100 microamperes. This illustration does not of course take into account the circuits which must be continuously powered such as the timing 334, sample and hold and amplifier circuits. However, these circuits can usually be designed to consume very little power.

The configurations of FIG. 4 and FIG. 4A offer high stability with relatively low cost and complexity. The transducers 16 and 18 are powered from the same source amplifier 248 and thereby exhibit low differential phase error. The receiving signal processing circuits are arranged to minimize circuit related phase errors. This is particularly true if one incorporates the blocks of FIG. 4A

Another advantage of the configuration depicted in FIG. 4 is that because acoustic transmission and reception occur for both transducers at the same time, rapidly occurring acoustic path changes introduce minimal error. With sensor configurations which rely on alternating transducer functions where at one time a first transducer transmits and a second receives, and at another time the second transducer transmits while the first receives, acoustic path changes may introduce significant error when relatively long intervals occur between their alternating states.

The embodiment discussed with respect to FIG. 2 of the drawing has each transducer in either a transmitting or a receiving mode at all times. In this arrangement there are no "dead" times in which a receiving portion of the sensor ignores acoustic artifacts associated with extraneous reflections which may arise from pipe interfaces if the transducers are external to a pipe through which fluid flow. Hence, the embodiment discussed with respect to FIG. 2 is generally restricted to use with wetted transducers. The burst-mode embodiment, however, can easily be configured with such dead periods and therefore permits the use of one or more non-wetted transducers installed on the outside of a pipe through which fluid flows.

It may be noted that the simultaneous transmission arrangement depicted in FIGS. 4 and 4A, like the alternating transmission arrangement of FIG. 2, can be extended by the addition of a second pair of transducers 370, 372 that operate with an acoustic beam 374 disposed orthogonally to the beam 22 generated by the first pair 16, 18 of transducers. As noted above with respect to the alternating transmission arrangement, the second pair 370, 372 of transducers may be operated either with separate circuitry, or may time-share the same circuitry used for the first pair 16, 18.

When used in flow environments which encourage the accumulation of surface coatings, debris or biogrowths, electrolytic means may be used to clean or maintain clean the acoustically active surfaces when wetted transducers are employed. This would consist, in a sea water environment for example, of a positive potential being applied to the flow sensing or nearby surfaces which had been platinum plated so as to cause a corresponding electric current to flow through the water and generate chlorine gas at those active surfaces. Nearby insulated electrodes or conductive surfaces with a corresponding negative potential complete the current path. Low currents of several miliamperes and less have been found effective in maintaining the surfaces of a small flow sensor of a few square inches in surface area clean in such environments.

Those skilled in the art can now appreciate from the foregoing description that the broad teachings of the present invention can be implemented in a variety of forms where a transit-time ultrasonic flow sensor is configured as a self contained modular system. Therefore, while this invention has been described in connection with particular examples thereof, the true scope of the invention should not be so limited since other modifications will become apparent to the skilled practitioner upon a study of the drawings, specifications and claims.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A flow sensor for determining a flow rate of a fluid from measurements of acoustic transmissions through the fluid, the sensor comprising:

first and second transducers located in acoustic contact with the fluid when the sensor is operating, each of the transducers having a respective transmitting state and a respective receiving state, each of the transducers transmitting acoustic energy when in its respective transmitting state, each transducer receiving acoustic energy transmitted by the other transducer when said each transducer is in its respective receiving state;

a carrier signal oscillator circuit for generating an electrical carrier signal at a controlled carrier frequency;

a transmitting switching means operated under control of a timing circuit to switch between a closed state in which the transmitting switching means simultaneously connects the carrier signal oscillator to both of the transducers, thereby placing both of the transducers in their respective transmitting states, and an open state in which the transmitting switching means disconnects both of the transducers from the carrier signal oscillator;

a receiving switching means operated under control of the timing circuit to switch between a closed state in which it separately electrically connects each of the transducers to a respective receiver, and an open state in which it disconnects each of the transducers from the respective receiver;

first and second phase detectors having respective outputs representative of a phase difference between two inputs, each of the phase detectors having a respective first input from a respective one of the receivers and a second input from the carrier signal oscillator;

a frequency control circuit having an input from at least one of the phase detectors, the frequency control circuit controlling the carrier signal oscillator to operate at the controlled frequency; and means for comparing the outputs from the two phase detectors and for generating a rate output signal responsive to the comparison.

2. The sensor of claim 1 further comprising a transmitting amplifier electrically connected between the carrier signal oscillator and the transmitting switching means.

3. The sensor of claim 1 wherein each of the phase detectors has its respective output connected to a low pass filter, the low pass filter having an output connected to the means for comparing.

4. The sensor of claim 1 wherein the means for comparing the outputs from the two phase detectors comprises two sample and hold circuits, each of the sample and hold circuits receiving an input from a respective one of the phase detectors, each of the sample and hold circuits having a respective output to a differential amplifier.

5. The sensor of claim 1 wherein the transmitting and receiving switching means comprise separate relays.

6. The sensor of claim 1 wherein the frequency control circuit has an input from only one of the phase detectors.

7. The sensor of claim 1 wherein the frequency control circuit comprises a circuit element having a long time constant.

8. The sensor of claim 1 wherein the controlled frequency is a frequency selected to cause the output of at least one of the phase detectors to be in the middle of its operating range.

9. The sensor of claim 1 wherein the first and second transducers directly face each other along a straight line.

10. The sensor of claim 1 wherein the fluid flows through a pipe and wherein the first and second transducers are disposed external to the pipe.

11. The sensor of claim 10 wherein the pipe comprises at least one portion adapted to reflect the transmitted acoustic energy from one of the transducers to the other of the transducers.

12. The sensor of claim 1, further comprising a reset detector adapted to momentarily connect the frequency control circuit to a reference voltage input and thereby to control the carrier signal oscillator to operate at a center of its operating range.

13. The sensor of claim 12, wherein the reset detector operates responsive to a low frequency oscillator.

14. The sensor of claim 12, wherein the reset detector operates responsive to an operating condition.

15. The flow sensor of claim 1, further comprising a third transducer and a fourth transducer which are mounted orthogonally as a pair to said first and said second transducers, said sensor further comprising processing means for determining a component of said flow rate which is orthogonal to an axis extending between the third and the fourth transducers.

16. The flow sensor of claim 1, further comprising a third transducer and a fourth transducer which are mounted as a pair orthogonally to said first and said second transducers, said sensor further comprising processing means responsive to changes in the speed of sound of said fluid to correct said output signal for said changes.

17. A flow sensor for determining a flow rate of a fluid from measurements of acoustic transmissions through the fluid, the sensor comprising:

first and second transducers located in acoustic contact with the fluid when the sensor is operating, each of the transducers having a respective transmitting state and a respective receiving state, each of the transducers transmitting acoustic energy when in its respective transmitting state, each transducer receiving acoustic energy transmitted by the other transducer when said each transducer is in its respective receiving state;

a carrier signal oscillator circuit for generating an electrical carrier signal at a controlled carrier frequency;

a transmitting switching means operated under control of a timing circuit to switch between a closed state in which the transmitting switching means simultaneously connects the carrier signal oscillator to both of the transducers, thereby placing both of the transducers in their respective transmitting states, and an open state in which the transmitting switching means disconnects both of the transducers from the carrier signal oscillator;

a signal route exchange switching means having two settings and operating so that when the route exchange switching means is in the first of the two settings one of the transducers is connected to a first of two receivers which has an output to a first phase detector and the second of the two transducers is connected to the second receiver, which has an output to a second phase detector, each of the two phase detectors having a respective output supplied to a means for comparing the outputs, and when the route exchange switching means is in the second setting said one of the transducers is connected to the second receiver and that phase detector receiving an input from said second receiver provides an output to the first connection to the means for comparing the outputs.

18. The sensor of claim 17 comprising a frequency divider toggling the signal route exchange switching means after a transit time interval.

19. The sensor of claim 17 wherein the route exchange switching means comprises a pair of relays.

20. A method of measuring a component of a flow rate of a fluid, the method comprising the steps of:

a) spacing two transducers out along a line so that each of the transducers is in acoustic contact with the fluid;

b) simultaneously connecting both of the transducers for a selected interval to a carrier signal oscillator having an output at a controlled frequency, thereby causing each of the transducers to transmit a respective acoustic signal into the fluid;

c) disconnecting, after the conclusion of the selected interval, both of the transducers from the oscillator and connecting each of the transducers to a respective receiver, whereupon each receiver outputs a respective received signal representative of the acoustic signal generated by the transducer other than the one to which it is then connected;

d) supplying each of the respective received outputs as respective first inputs to respective phase detectors, each of the phase detectors having a second input from the carrier signal oscillator, each of the phase detectors having an output representative of a respective phase difference between the oscillator and that receiver from which it is supplied;

e) measuring a difference between the outputs of the two phase detectors and supplying that difference as an output representative of the component of the flow rate along the line; and f) supplying an output from at least one of the phase detectors to a frequency control circuit controlling the carrier signal oscillator to operate at the controlled frequency.

21. The method of claim 20 wherein the outputs of the phase detectors are respective time varying voltage signals that are filtered by respective low pass filters, sampled and held by respective sample and hold circuits and supplied as respective inputs to a differential amplifier having a DC voltage level output that is representative of the flow rate.

22. The method of claim 20 wherein the two transducers are spaced apart by a known distance, and wherein the interval during which the two transducers are connected to the carrier signal oscillator is selected to be equal to a transit time required for an acoustic signal from one of the transducers to travel to the other of the transducers.

23. The method of claim 20 wherein steps b) through d) are repeated, wherein a pair of signal exchange relays is toggled between repetitions so that each transducer is connected to a different one of the two receivers on successive repetitions of steps b) through d) and wherein the step of measuring the difference between the outputs of the two phase detectors comprises averaging the outputs of the phase detectors over a selected number of repetitions.

24. The method of claim 20 wherein each of the two transducers is wetted by the fluid.

25. The method of claim 20 wherein at least one of the two transducers is attached to the outside of a pipe through which the fluid flows.

26. The method of claim 20 wherein the outputs of the phase detectors are respective time varying voltage signals and wherein at least one of the outputs of the phase detectors is supplied as an input to the frequency control circuit comprising a differential amplifier having an output acting to control the controlled frequency of the carrier signal oscillator so that an average output of the at least one of the phase detectors is maintained at a center of its operating range.

27. The method of claim 20 wherein the carrier signal oscillator has a predetermined operating range and wherein the method further comprises a reset step of forcing the signal oscillator to operate in a middle of its operating range.

28. The method of claim 27 wherein the reset step occurs periodically responsive to a low frequency oscillator.

29. The method of claim 27 wherein the reset step is taken responsive to an operating condition.

30. The method of claim 20, wherein the fluid flows in a predetermined direction and wherein the line along which the two transducers are spaced is parallel to the predetermined direction.

31. The method of claim 20, wherein step a) further comprises spacing a second two transducers out along a second line orthogonal to the first line, and wherein steps b) through e) are separately carried out with the second two transducers so as to provide two outputs, each output respectively representative of a component of flow along a respective one of the two orthogonal lines.

32. A transit-time flow sensor for measuring an acoustic propagation time difference between upstream and downstream acoustic transmissions in a fluid and for determining the flow rate of the fluid therefrom, the sensor comprising:

first and second transducers, each of the transducers wetted by the fluid when the sensor is operating, each of the transducers having a respective transmitting functional state and a respective receiving functional state, each of the transducers transmitting acoustic energy at a first frequency along an axis parallel to a direction of flow of said fluid when said each transducer is in its respective transmitting state, each transducer receiving said acoustic energy transmitted by the other transducer when said each transducer is in its receiving state;

means for alternating the transmitting and receiving states of the transducers so as to always have one of the two transducers in its respective transmitting state and the other of the two transducers in its respective receiving state when the sensor is operating, the means for alternating acting at a second frequency substantially less than the first frequency;

a carrier signal oscillator circuit providing a continuous carrier signal at the first frequency to the transmitting one of said transducers when the sensor is operating; and a phase detector containing a low pass filter for providing an output signal responsive to a phase difference between electrical signals corresponding to, and of the same frequency as, the transmitted and received acoustic energy.

33. The sensor of claim 32 wherein the first and second transducers directly face each other along a straight line.

34. The sensor of claim 32 wherein the fluid flows through a pipe comprising at least one portion adapted to reflect the transmitted acoustic energy from one of the transducers to the other of the transducers.

35. The sensor of claim 32, further comprising means to correct a drift in said phase difference between said transmitted and received acoustic energy by changing the first frequency.

36. The sensor of claim 32, further comprising means to correct a drift in said phase difference between said transmitted and received acoustic energy by a phase shift change of the phase relationship of said electrical signals corresponding to the transmitted and received acoustic energy.

* * * * *